(12) United States Patent
Ninoles et al.

(10) Patent No.: US 9,968,856 B1
(45) Date of Patent: May 15, 2018

(54) SYSTEMS AND METHODS OF VIDEO GAME STREAMING WITH INTERACTIVE OVERLAY AND ADDITIONAL DATA

(71) Applicant: GENVID TECHNOLOGIES, INC., New York, NY (US)

(72) Inventors: Fabien Ninoles, Montréal (CA); Jocelyn Houle, Mont-St-Hilaire (CA)

(73) Assignee: Genvid Technologies, Inc., New York, NY (US)

( * ) Notice: Subject to any disclaimer, the term of this patent is extended or adjusted under 35 U.S.C. 154(b) by 0 days. days.

(21) Appl. No.: 15/352,421

(22) Filed: Nov. 15, 2016

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/86 | (2014.01) |
| A63F 13/53 | (2014.01) |
| A63F 13/35 | (2014.01) |
| A63F 13/25 | (2014.01) |

(52) U.S. Cl.
CPC .............. *A63F 13/86* (2014.09); *A63F 13/25* (2014.09); *A63F 13/35* (2014.09); *A63F 13/53* (2014.09)

(58) Field of Classification Search
CPC .................................................. A63F 2300/572
USPC ...................................................... 463/31, 42
See application file for complete search history.

(56) References Cited

U.S. PATENT DOCUMENTS

| | | |
|---|---|---|
| 6,072,503 A | 6/2000 | Tani et al. |
| 6,791,579 B2 | 9/2004 | Markel |
| 7,446,722 B2 | 11/2008 | Sohfuku |
| 9,266,017 B1 | 2/2016 | Parker et al. |
| 2005/0210512 A1 | 9/2005 | Anderson et al. |
| 2014/0366057 A1 | 12/2014 | Brockmann et al. |
| 2016/0030841 A1 | 2/2016 | Perlman et al. |

OTHER PUBLICATIONS

U.S. Appl. No. 15/352,441, filed Nov. 15, 2016, Ninoles et al.
U.S. Appl. No. 15/352,433, filed Nov. 15, 2016, Houle et al.

*Primary Examiner* — Kevin Y Kim
(74) *Attorney, Agent, or Firm* — Foley & Lardner LLP

(57) ABSTRACT

Systems and methods to provide interactive overlays with video game streams can include a composing and broadcast system receiving a plurality of video game streams associated with a respective plurality of viewpoints of an online game from a game engine. The composing and broadcast system can select a video game stream of the plurality of video game streams, and transmit the selected video game stream to a live streaming system for streaming to a plurality of spectator client devices. The composing and broadcast system can stream game data indicative of positions of a graphical object in the selected video game steam receive to a plurality of spectator client devices. A client device receiving the selected video game stream and the game data can display an interactive overlay over displayed video frames. The interactive display can be temporally and spatially synchronized with a graphical object in the displayed video frames.

20 Claims, 5 Drawing Sheets

SYSTEMS AND METHODS OF VIDEO GAME STREAMING WITH INTERACTIVE OVERLAY AND ADDITIONAL DATA

BACKGROUND

Live game (and eSports) streaming platforms, such as Twitch, YouTube Gaming, Ustream, and other platforms (or websites) allow game players to livestream their video game plays. Players in multi-player online have shared their game plays online via the live streaming platforms. Viewers (or spectators) watch the games in real-time as they progress. Some live game streaming platforms support separate live chat features allowing viewers or spectators to comment on games they are watching and share their comments with other viewers.

Due to the technological challenges, the live game feeds have limited functionality diminishing gaming and spectator entertainment. Every month, live game steaming platforms nevertheless attract millions of gamers, including players and spectators. There is need for technological improvement to provide more advanced live gaming.

SUMMARY

At least some embodiments relate to a system to provide interactive overlays with video game streams that can include one or more computer servers and one or more software scripts executing on a plurality of client devices associated with a plurality of online spectators of an online game. The one or more servers can include a video streaming engine, and data streaming engine. The video streaming engine can receive, from a game engine, a plurality of video game sequences associated with a respective plurality of viewpoints of the online game, select a video game sequence of the plurality of video game sequences, and transmit a compressed version of the selected video game sequence to a live streaming system. The live streaming system can stream the selected video game sequence to the plurality of client devices. The data streaming engine can receive, from the game engine, metadata associated with the online game. The metadata can include positioning information for a graphical object in the online video game. The data streaming engine can generate a sequence of data frames based on the metadata. Each data frame can include a respective time stamp and positioning information for the graphical object in a respective frame of the video game sequence. The data streaming engine can stream the sequence of data frames to the plurality of client devices. The one or more software scripts can cause a client device of the plurality of client devices to display an interactive overlay over displayed frames of the video game sequence based on the sequence of data frames. The interactive overlay displayed in association with a dynamic position of a graphical object in each frame of the displayed video game frames.

At least some embodiments relate to a method of providing interactive overlays with video game streams that can include one or more processors receiving, from a game engine, a plurality of video game sequences associated with a respective plurality of viewpoints of an online game. The one or more processors can select a video game sequence of the plurality of video game sequences, and transmit a compressed version of the selected video game sequence to a live streaming system. The live streaming system can stream the selected video game sequence to a plurality of client devices. The method can include the one or more processors receiving metadata associated with the online game. The metadata can include positioning information for a graphical object in the online video game. The one or more processors can generate a sequence of data frames based on the metadata. Each data frame can include a respective time stamp and positioning information for the graphical object in a respective frame of the video game sequence. The one or more processors can stream the sequence of data frames to the plurality of client devices. The method can include a client device of the plurality of client devices displaying an interactive overlay over displayed frames of the video game sequence based on the sequence of data frames. The interactive overlay can be displayed in association with a dynamic position of a graphical object in each frame of the displayed video game frames.

At least some embodiments relate to a non-transitory computer-readable medium including computer code instructions thereon. The computer code instructions, when executed by one or more processors of data processing system, can cause the data processing system to perform a method of providing interactive overlays with video game streams. The method can include receiving, from a game engine, a plurality of video game sequences associated with a respective plurality of viewpoints of an online game, selecting a video game sequence of the plurality of video game sequences, and transmitting a compressed version of the selected video game sequence to a live streaming system. The live streaming system can stream the selected video game sequence to a plurality of client devices. The method can include receiving, from the game engine, metadata associated with the online game. The metadata can include positioning information for a graphical object in the online video game. The method can include generating a sequence of data frames based on the metadata. Each data frame including a respective time stamp and positioning information for the graphical object in a respective frame of the video game sequence. The method can include streaming the sequence of data frames to the plurality of client devices, and displaying, at a client device of the plurality of client devices, an interactive overlay over displayed frames of the video game sequence based on the sequence of data frames. The interactive overlay can be displayed in association with a dynamic position of a graphical object in each frame of the displayed video game frames.

BRIEF DESCRIPTION OF THE DRAWINGS

The details of some embodiments are set forth in the accompanying drawings and the description below. Other features, aspects, and advantages of the various embodiments will become apparent from the description, the drawings, and the claims, in which:

Figure 1:
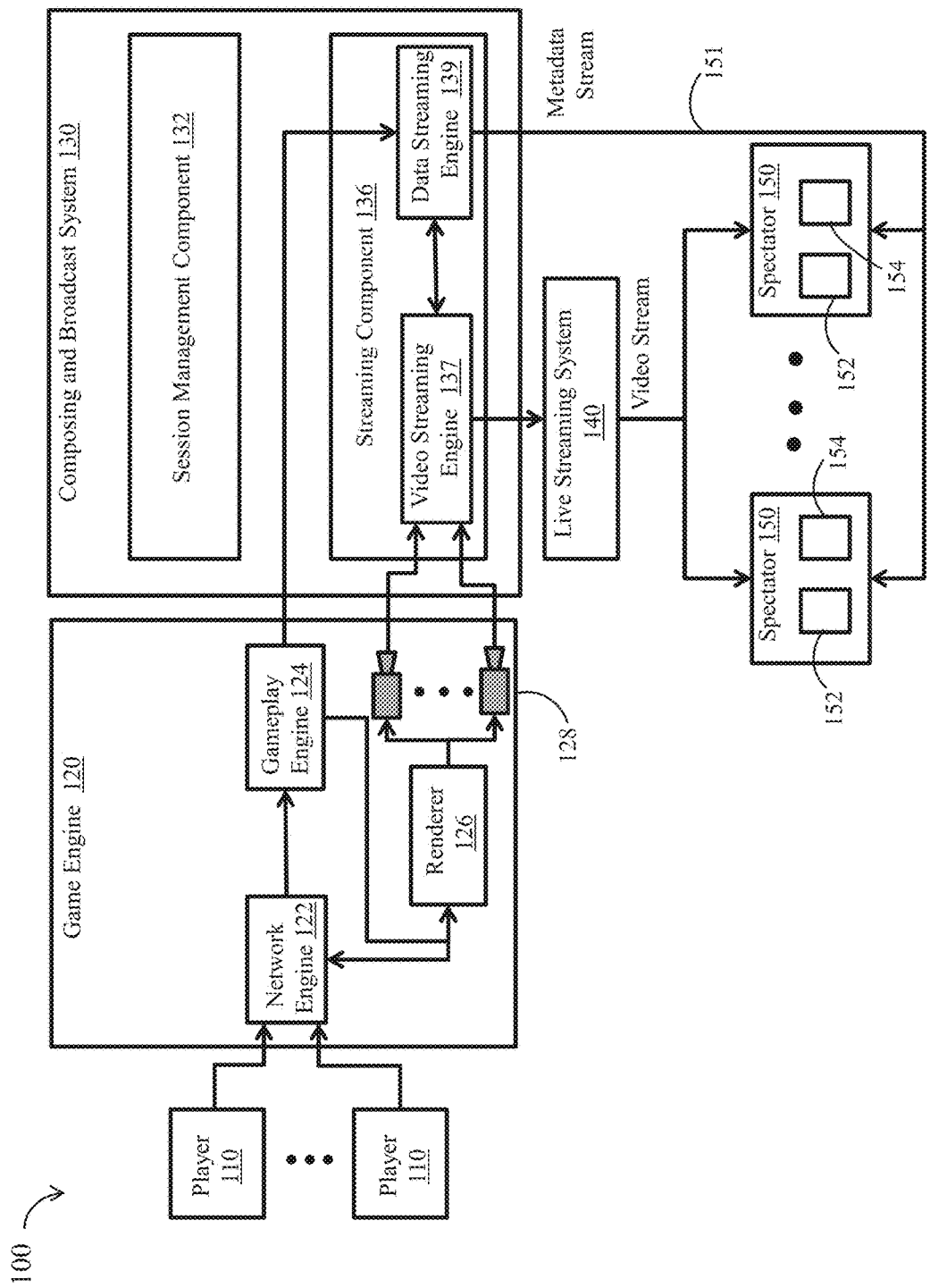
FIG. 1 is a block diagram illustrating a computer environment for streaming video games with interactive overlay, according to some embodiments.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and implementations of, methods, apparatuses, and systems for interactive game streaming solutions. Interactive game streaming solutions relate to techniques and tools for enabling viewers or spectators watching a video stream of an online game to interact with and/or customize video objects in the video stream displayed on their client devices. The various concepts introduced above and discussed in greater detail below may be implemented in any of numerous ways as the described concepts are not limited to any particular manner of implementation. Examples of specific implementations and applications are provided primarily for illustrative purposes.

Live game streaming platforms add another dimension to online gaming that can lead to a dramatic increase in online gaming communities. This potential interest in live game streams calls for improvements to user experience beyond video streaming quality. For example, providing interactivity and/or customization features can enable online video game spectators take a more active role with respect to their viewing experience.

Existing live game streaming solutions provide the same content to various users. Some live game streaming platforms offer separate chat solutions with the streamed video, allowing spectators to comment on the game and interact with other spectators. However, the spectators' viewing experience is still passive with respect to the lack of spectator interactivity with the displayed video stream. Systems, apparatuses, and methods described herein can provide another layer to live game streaming that allows spectators to start taking an active role in their viewing experience. For example, the systems, apparatuses, and methods described herein provide an overlay for display over the video streams displayed on spectator client devices. Among other things, the spectator users can interact with the overlay to customize their viewing experience with additional game data (also referred to herein as metadata) that they can choose to view or not view. Spectators can tailor extra game information based on their taste so that live game streaming is no longer a one-size-fits-all situation, but rather a personalized experience.

Providing a more active role to spectators in a live game streaming session by allowing customized or personalized viewing experience poses significant technical challenges. Video streams, by their nature, do not provide significant interactivity features to viewers, and streaming different streams to different spectators, for example, based on spectators' feedback, is technologically challenging with regard to processing load, communication load, and speed of coordinating or adapting streamed video based on spectators' commands or requests. Given that the number of spectators associated with any game broadcast session can dynamically vary during the session, scalability is also an important technological challenge to optimize the amount of computational resources used.

Novel concepts and technological advancements described herein allow for scalable and interactive live game streaming solutions. Systems, apparatuses, and methods described herein can support live game streaming for hundreds of thousands or millions of spectators while maintain healthy states.

Systems, apparatuses, and methods to provide interactive overlays with video game streams can include a composing and broadcast system receiving a plurality of video game streams (or video game sequences) associated with a respective plurality of viewpoints of an online game from a game engine. In some embodiments, the composing and broadcast system can select a video game stream (or video game sequence) of the plurality of video game streams (or video game sequences), and transmit an encoded version of the selected video game stream (or video game sequence) to a live streaming system. The live streaming system can stream the selected video game stream (or video game sequence) to a plurality of spectator client devices. In some embodiments, the composing and broadcast system can receive, from the game engine, game data associated with the online game. The game data can include positioning information for one or more graphical objects, such as a player avatar, in the online video game. The game data can generate a sequence of data frames (or data chunks) based on the received game data. In some embodiments, each data frame can include a respective time stamp and positioning information for the one or more graphical objects in a respective video frame of the video game stream (or video game sequence). The composing and broadcast system can then stream the sequence of data frames (or data chunks) to the plurality of spectator client devices.

In some embodiments, at each spectator client device of the plurality of client devices, an application (e.g., a browser or a gaming application) can play the video game stream (or video game sequence) received from the live game streaming system. Simultaneously, one or more software scripts (e.g., including a Java script) can cause that client device to display an interactive overlay over displayed frames of the video game stream (or video game sequence) based on the received sequence of data frames. The one or more software scripts can use, for example, the positioning information for the one or more graphical objects and the time stamps in each data frame and time stamps embedded in the received video game sequence to display the interactive overlay over frames of the video game sequence, such that a dynamic position of the overly depends on a position of a graphical object, of the one or more graphical objects, in each frame of the displayed video frames.

FIG. 1 is a block diagram illustrating a computer environment 100 for streaming video games with interactive overlays, according to some embodiments. The computer environment 100 can include a plurality of player client devices 110, a game engine 120, a composing and broadcast system 130, a live streaming system 140, and a plurality of spectator client devices 150. The game engine 120 can include a network engine 122, a gameplay engine 124 and a render 126. The composing and broadcast system 130 can include a session management component 132, and a streaming component 136. The streaming component 136 can include one or more video streaming engines 137 and one or more data streaming engines 139.

The player client devices 110 can include an application, such as a browser or a gaming application to initiate and participate in an online game as a player. When participating in the online game, a player client application 110 can control one or more player avatars in the game. In a multi-player game, separate player client devices 110 can control separate or distinct player avatars. The application can allow initiating a live game streaming session to broadcast a game play online. The online game can be provided by the game engine 120.

The game engine 120 can include a software, running on one or more computing devices, for creating and developing a video game. The game engine 120 can include a network engine 122 for communicating with player client devices 110. The network engine 122 can establish communication channels between the game engine 120 and the player client devices 110, upon the player client devices 110 initiating a game session. The network engine 122 can transmit video game streams (e.g., including a respective video sequence and a respective audio sequence) of the game from the renderer 126 to the player client devices 110. Each player client device 110 can receive a respective video game stream over a communication channel between that player client device 110 and the game engine 120. For each player client device 110, the respective received video game stream can correspond to a viewpoint associated with a player avatar controlled by that player client device 110. As a user of a player client device 110 interacts with the game, that player client device 110 can transmit signals indicative, or indications, of actions taken by the user to the network engine 122. The network engine 122 can forward the received signals or indications the gameplay engine 124.

The gameplay engine 124 can analyze the received signals or indications received from the player client device 110 to detect game events corresponding to the user actions. For example, the gameplay engine 124 can detect game events, such as motion, changes in player's viewpoint, collisions, kills, clicks on menu elements, or the like. The gameplay engine 124 can forward indications of the detected events to the renderer 126. The gameplay engine 124 can also maintain game data, such as scores, equipment, or other information associated with various players or graphical objects in the game. The gameplay engine 124 can transmit the game data (also referred to herein as metadata) or indications of some of the detected events to the composing and broadcast system 130.

The renderer 126 can generate a video game sequence (or video game stream) for each player (or each player client device 110), based on the viewpoint and the detected events associated with that player client device 110. The renderer 126 can forward generated video frames to the network engine 122 for steaming to the player client devices 110. The renderer 126 may also generate other video sequences corresponding to additional viewpoints associated with virtual cameras (e.g., not associated with players or player avatars). The renderer 126 can transmit generated video frames from the various video sequences 128, e.g., associated with players and virtual cameras, to the composing and broadcast system 130.

The composing and broadcast system 130 can include one or more computer servers (e.g., Linux servers) for executing a cluster of virtual servers (both not shown in FIG. 1) for each video/audio stream, e.g., associated with a respective game and a group of players or player client devices 110. The composing and broadcast system 130 can execute a plurality of clusters of virtual servers, associated with a respective plurality of video/audio streams (or game broadcast sessions), simultaneously. The cluster of virtual servers can handle three types of data; commands received either from the game engine 120 to create (or terminate) a game broadcast session or from spectator client devices 150 to access the game broadcast session, game and events data received either from the game engine 120 or collected from the spectator client devices 110. The cluster of virtual servers can include three different types of virtual servers for running or executing different types of services (or processes). The three types of virtual servers can include supervisor servers, internal worker servers, and public worker servers. Services provided or executed by the cluster can include streaming services, control services, communication services, authentication services, event services, or a combination thereof.

The supervisor servers can supervise and coordinate the services (or processes) running on the worker servers (e.g., internal ad public worker servers). The supervisor servers can be a small group of micro servers that act as a point of registration and authority, or orchestration, for all the other services. While a single supervisor server may be enough, it may be desirable to have three or more supervisor servers are to achieve high availability of the cluster. The group of supervisor servers can keep the state of orchestration services consistent using, for example, a gossip protocol with a simple majority. The consistency between various supervisor servers with respect to the state of orchestration allows for half of the supervisor servers to go down without affecting the services provided or executed by the cluster. The supervisor servers can run or execute tasks such as, High-Available Key-Value store for configuration, registration service(s), monitoring service(s), scheduler service(s), or a combination thereof. The registration services relate to the mechanisms or tools provided to allow the game engine 120 or the player client applications 110 to register or initiate a game broadcast session. Registration service(s) can be exposed to the game engine 120 (or player client devices 110) through a domain name system (DNS) and/or a hypertext transfer protocol (HTTP) application program interface (API). The supervisor servers can monitor other services (or processes) executed by internal and public worker servers and report the health of the different worker server instances. The scheduler service(s) can include scaling up and down the different services (e.g., executed by the worker servers) and restart them when they go down. The supervisor servers may be designed not to run or execute other tasks (e.g., beyond the tasks described above), instead the supervisor servers can delegate such other tasks to the worker servers.

The internal and public worker servers can be configured to execute and monitor the tasks scheduled by the supervisor servers. The difference between the public and internal workers is that only the public workers can be accessible from an external, unregistered Internet protocol (IP) address. The internal workers can be accessible to a limited set of pre-registered network range (e.g., IP addresses associated with the game engine 120), as a security precaution. The public worker servers can be configured to execute processes and tasks related mainly to the spectator client devices 150, whereas the internal worker servers can execute processes and tasks associated with the gaming engine 120. Given that the number of spectator client devices 150 can be relatively large (e.g., compared to the number of player client devices 110), the cluster can include a larger number of running instances of public worker servers than the internal worker servers. Both public and internal worker servers can run a client version of the orchestration services to report to the supervisor servers. The supervisor servers can be configured to automatically provision, allocate, or de-allocate worker servers as the load of processes (or services) goes up and down. Since, the internal worker servers handle mainly services related to the game engine 120, the internal worker servers can have a more stable load than public worker servers. The load of public worker servers can be proportional to the number of spectator client devices 150. As spectators connect or drop off, the load of public worker servers can vary dynamically over time.

The use of virtual servers, as described above, to implement the composing and broadcast system 130 can allow for dynamic system scalability whether in terms of the number of clusters running or the number of virtual servers in each cluster. The composing and broadcast system 130 may allocate a respective cluster of virtual servers for each initiated game broadcast session, and de-allocate that cluster once the game broadcast session is terminated. Also, as described above, the supervisor servers in each cluster can dynamically allocate or de-allocate worker servers as the load of running services (or the number of spectator client devices 150) increases or decreases. In some embodiments, the composing and broadcast system 130 can be implemented as a software development kit (SDK) that is integrated with the game engine 120.

While the implementation of composing and broadcast system described herein is based on virtual servers, such implementations should not be interpreted as limiting, and other implementations are contemplated by embodiments of this disclosure. For example, the composing and broadcast system 130 can run (or execute) on one or more player client devices 110. The player client device(s) 110 can still transmit the video game stream(s) to the live streaming system 140, and transmit game data (or metadata) to one or more engines associated with the live streaming system 140 for multicasting to the spectator client devices 150.

The composing and broadcast system 130 can include a session management component 132. The session management component 132 can be configured to provide and manage various services (or processes) including control service(s), user authentication service(s), and communication service(s). Control Service(s) can provide the point of entry for the game engine 120 to other services of the composing and broadcast system 130. The control service(s) can allow the game engine 120 to register a new stream (or new game broadcast session) and request for new channel endpoint. The control service(s) can also provide information about the health of the cluster via an administrative interface associated with, for example, the game engine 120. An administrator of the game engine 120 can monitor and administrate the cluster via the administrative interface. The control service(s) can also provide information related to registered streams (e.g., registered for live streaming) to be published for spectator client devices 150 or other client devices.

Authentication service(s) (or process(es)) can allow client devices to query the composing and broadcast system 130 about current streams playing (if any) and to request a new entry point for the streaming service(s) provided by the streaming component 136. The communication service(s) (or process(es)) can include handling with the spectator client devices 150. In particular, the communication service(s) can include establishing and/or terminating communication channels 151 with spectator client devices 150 as such devices connect to or disconnect from the composing and broadcast system 130. The established communication channels 151 can be bi-directional and carry game data received, for example, from the gameplay engine 124 to spectator client devices 150, or carry indications of user interactions from the spectator client devices 150 to the composing and broadcast system 130.

The streaming component 136 can include a plurality of streaming engines including one or more video streaming engines 137 and one or more data streaming engines 139. In some embodiments, the video streaming engine(s) 137 and the data streaming engine(s) can include (or can be implemented using) public worker servers. The video streaming engine(s) 137 can receive a plurality of video game streams 128 from the renderer 126, each corresponding to a respective viewpoint. Each received video game stream can include a respective video stream (or video sequence) and a respective audio stream (or audio sequence). The video streaming engine(s) 137 can select one of the video game streams, encode respective video and audio frames into compressed video/audio frames, and transmit the video/audio frames to the live streaming system 140. The video streaming engine(s) 137 can encode the video data of the selected video game stream, for example, using H.264/MPEG-4 AVC or some other video compression standard. The video streaming engine(s) 137 may also encode the audio audio of the selected video game stream, for example, using MPEG-2 Audio Layer iii (MP3), Advanced Audio Coding (AAC), or another audio coding format.

The data streaming engine 139 can be configured to receive game data received from the gameplay engine 124. In some embodiments, the data streaming engine 139 can generate data frames, based on game data received from the gameplay engine 124, according to a predefined format. The data streaming engine 139 may also filter the game data received from the gameplay engine 124 when generating the data frames. Each data frame can include a respective timestamp (or time code) to synchronize the data frame with a respective video game (or video/audio) frame. The timestamp associated with each data frame can allow placing that data frame within a game data stream and mapping that data frame to the corresponding video game frame. The data streaming engine 139 can communicate with the video streaming engine 137 to coordinate allocation of timestamps to video game frames and data frames. As discussed in further detail below, a data frame can include information indicative of positions(s) of one or more graphical objects within the corresponding video frame, viewpoint information, game event information, list of players or player avatars, or a combination thereof. The data streaming engine(s) 139 can stream the data frames carrying game data (or metadata) to the plurality of spectator client devices 150 through respective communication channels 151. The data streaming engine(s) 139 can stream the data frames according to the respective time frames.

The live streaming system 140 can include a live game streaming platform such as Twitch, Ustream, YouTube Gaming, or the like. The live streaming system 140 can receive the video game frames from the video streaming engine 137, and broadcast the video game frames, e.g., via a respective web page, to the spectator client devices 150. The live streaming system 140 can modify the timestamps of the video game frames before broadcasting to the spectator client devices 150.

Each spectator client device 150 can include an application 152 for playing the video game stream received from the live streaming system 140, and one or more software scripts 154 for generating and displaying an overlay based at least on the data stream received from the data streaming engine 139. The software script(s) can include, for example, a Java script and/or one or more other software modules. The software script 154 can cause the spectator client device 150 to scan each data frame received to retrieve the respective timestamp and position information for one or more graphical objects (e.g., one or more player avatars). The software script(s) 154 can compare the retrieved timestamp to one or more timestamps associated with the video game frames to map the scanned data frame to the corresponding video game frame. Since the data stream and the video game stream are received from distinct sources through distinct communications paths, the spectator client device 150 may apply techniques described synchronization techniques described in the Patent Application entitled "SYSTEMS AND METHODS FOR UTILIZING CLIENT-SIDE SYNCHRONIZATION OF VIDEO AND OVERLAY," and having Ser. No. 15/352,433, which is incorporated herein by reference in its entirety.

Upon determining a video frame corresponding to the scanned data frame, the software script(s) 154 can cause the spectator client device 150 to display an interactive overlay over the determined video frame, based on the position of a graphical object in the determined video game frame. In some embodiments, the software script(s) 154 can cause the spectator client device 150 to display a plurality of interactive overlays, for example, each associated with a respective player avatar. The user of the spectator client device 150 can interact with the interactive overlay, for example, by clicking, touching, or hovering over the graphical object (or a screen area associated therewith) whose position is used to place the interactive overlay over the determined video frame.

As discussed in further detail below, the interactive overlay can allow the user of the spectator client device 150 to interact with the displayed video game frames in a variety of ways. Also, synchronizing the interactive overlay temporally and spatially with a graphical object (e.g., a player avatar) can allow the spectator users to customize or personalize their views of the game (e.g., local customization at the spectator client device 150) in a meaningful an fun way. The interactive features provided by the overlay can provide spectator users a satisfying and entertaining viewer experience.

The software script(s) 154 can be configured to transmit indications of user interactions with the overlay and or indications of user comments (e.g., via chat) to the composing and broadcast system 130. The composing and broadcast system 130 can use such indications, for example, to adapt or adjust the video game stream streamed to the spectator client devices 150 as described in the Patent Application entitled "SYSTEMS AND METHODS FOR VIDEO GAME STREAMING UTILIZING FEEDBACK AND AGGREGATION OF VIEWER INTERESTS AND INTERACTIONS," and having Ser. No. 15/352,441, which is incorporated herein by reference in its entirety.

Figure 2:
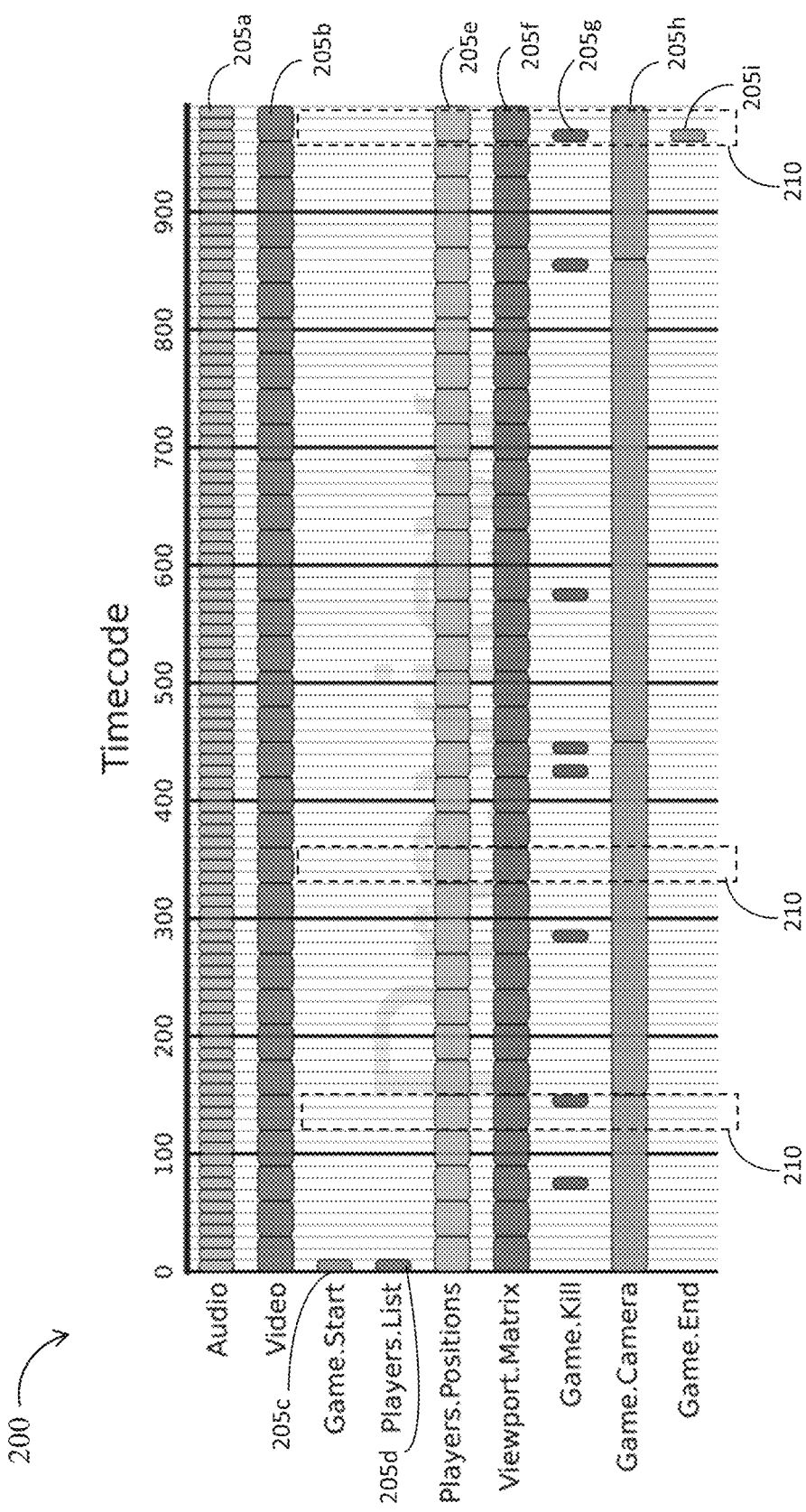
FIG. 2 is a graphical representation of several example data streams, according to some embodiments.

FIG. 2 is a graphical representation 200 of several example data streams 205*a*-205*i* (generally referred to as data streams 205), according to some embodiments. The data streams 205 are shown along a time (or timecode) axis which starts from zero on the left hand side of FIG. 2. Each data stream 205 can include one or more data chunks, each of which corresponds to a particular time instant/interval (or timecode). The video and audio streams 205*a* and 205*b* can be generated and provided by the renderer 126, whereas the streams 205*c-i* can be transmitted by the gameplay engine 124 to the data streaming engine 139.

Since the renderer 126 can generate and provide a plurality of video game streams (e.g., each including a video stream 205*a* and an audio stream 205*b*) associated with the plurality of viewpoints 128, the gameplay engine 124 can provide a single instance of each the streams 205*c-i* or can provide a plurality of instances of at least one of the streams 205*c-i*. For instance, the gameplay engine 124 can provide a plurality of streams 205*f*, each associated with a respective viewpoint 128. In some embodiments, the gameplay engine 124 can provide the data streaming engine 139 with a separate set of streams 205*e-g* or 205*e-f* for each viewpoint 128.

Each of the streams 205 can include a common stream identifier (ID). The stream ID can be indicative of (or can identify) the stream registered, e.g., for live streaming, by the player client devices 110 or by the game engine 120. For instance, upon request from one of the player client devices 110 to live stream the respective game play, the game engine 120 can initiate stream or game play) registration with the composing and broadcast system 130. The game engine 120 may, for example, identify a video frame rate and/or a bit rate as part of the stream (or game play) registration process. The composing and broadcast system 130 can assign a stream ID to identify all streams 205 associated with game play. The composing and broadcast system 130 can provide the assigned stream ID to the game engine 120, and the gameplay engine 124 and the renderer 126 can insert the stream ID in all streams 205. The stream ID can allow the composing and the broadcast system 130 to map the streams 205 to one another and to the game play associated with the player client device(s) 110.

Also, the gameplay engine 124 and the renderer 126 may insert a respective timestamp in each data chunk of the streams 205. For example, the gameplay engine 124 and the renderer 126 may embed the timestamps (or timecode information) in a header associated with each data chunk. The time stamps can allow streaming video and audio frames as well as data chunks/frames to spectator client devices in the right order. Also, the timestamps can allow computing devices receiving the data streams 205 (or data associated therewith) to synchronize the data chunks across various data streams 205. It should be understood that FIG. 2 is illustrative only, and that in some implementations, additional or different data streams 205 may be included without departing from the scope of this disclosure.

The data streaming engine 139 can generate one or more game data streams, for example, based on data in streams 205*c-i*, for streaming to the spectator client devices 150 via the respective channels 151. For example, the data streaming engine 139 can generate a single game data stream by combining concurrent data chunks from streams 205*c-i* (or a subset thereof) into a single data frame 210. The generated game data stream can include data frames 210 that coincide in time and duration with the video frames in the stream 205*b*. The size of the data frames 210 can vary over time. For example, event data from stream 205*g*, which indicates events occurring in the game, may not appear in each data frame 210. Also, the Game.Start data stream 205*c* can include a single data chunk associated with timecode 0, which can mark the beginning of the video game. Similarly, the Players.List data stream 205*d* can include a single data chunk associated with timecode 0. The Players.List data stream 205*d* can include information such as a total number of players in the video game, as well as information relating to each of the players, such as unique identification information (e.g., respective avatar name) and character information for each player. The Game.Start data and the Players.List data may appear, for example, only in the first data frame 210 of the data stream generated by the data streaming engine 139. The data streaming engine 139 can insert the stream ID and a single timestamp (e.g., timestamp from corresponding Players.Positions data chunk or corresponding Viewport.Matrix data chunk) in each data frame 210. Also, the same stream ID can be embedded (e.g., by the rendered 126 or the video streaming engine 137) in the corresponding game video stream provided to the live streaming system 140.

The data streaming engine 139 can generate the game data stream in one of various other ways. For example, the data streaming engine 139 may generate a first game data stream including only Players.Positions data from stream 205*e* and Viewport.Matrix data from stream 205*f*. The Players.Positions data stream 205*e* can include data indicative of the positions of the various players (or player avatars) within a virtual environment of the video game. For a given player avatar (or graphical object) in the online game, the respective Players.Positions data can be indicative of a pixel region (e.g., a rectangle) representative of the location of that player avatar (or graphical object) in a specific video frame of the stream 205*b*. The Viewport.Matrix data stream 205*f* can include information related to the viewpoint 128 associated with the video stream 205*a*. The data streaming engine 139 may embed Viewport.Matrix data associated with various players (player avatars) and/or various virtual cameras in the online game in each data frame 210.

Because the position of each player may change in every video frame, the Players.Positions data stream 205*e* can be updated at the same rate as the video data stream 205*b*. This information also can be expected to change at the same rate as the video data stream 205*b* and the Players.Positions data stream 205*e*. Like the Players.Positions data stream 205*e*, the Viewport.Matrix data stream 205*f* also can be updated at the same rate as the video data stream 205*b*.

The Game.Kill data stream 205*g* can include information relating to the elimination (or killing) of players (or player avatars) from the video game. This data is asynchronous and non-continuous, because it is only updated as players are eliminated from the video game. In some implementations, each data chunk of the Game.Kill data stream 205*h* can include an identification of the player who has been eliminated. In some implementations, the information included in the Game.Kill data stream 205*g* can be used along with the information in the Players.List data stream 205*d* to track the number of players who are still remaining in the game. In general, the data stream 205*g* can be indicative of game events (e.g., not necessarily restricted to killing events) and may be referred to as Events data stream 205*g*. The game events' data can include additional information for various players, such as respective game scores, equipment, health states, emotional states, the like, or a combination thereof.

The Game.Camera data stream 205*h* can include information relating to the viewpoint 128 corresponding to the video game stream selected and transmitted from the composing and broadcast system 130 to the live streaming system 140 for display on the spectator client devices 150. In some implementations, a new data chunk may be included in the Game.Camera data stream 205*h* each time the selected video game stream or the corresponding viewpoint 128 (or camera perspective) provided to spectators changes. When the video game stream selected for broadcasting to client devices 150 changes, the video streaming engine 137 can halt transmission of video/audio frames from the previously selected video game stream and start transmitting video/audio frames from the new selected video game stream to the live streaming system 140 for broadcasting to the client devices 150. In some implementations, the camera perspective shown to spectators may be the same as the perspective seen by one of the individual players as identified by the Viewport.Matrix data stream 205*f*. However, in some instances, the camera perspective shown to spectators may correspond to a virtual camera that is not associated with any of the individual players.

The Game.End data stream 205*i* includes a single data chunk, which can mark the end of the video game. In some implementations, the data chunk for the Game.End data stream 205*i* can be sent after every player has been eliminated from the game. In some other implementations, the data chunk for the Game.End data stream 205*i* can be sent after a predetermined period of time has elapsed since the start of the game, even if there are players who have not yet been eliminated from the game.

In some embodiments, the data streaming engine 139 can generate a second game data stream based on the streams 205*c*, 205*d*, and 205*g*-*i*. The data streaming engine 139 can combine data chunks from these streams to generate an asynchronous stream indicative of various events associated with the online game. In some embodiments, the data streaming engine 139 can stream the streams 205*c*-*i* separately to the spectator client devices 150, for example, through various logic communication channels.

Figure 3:
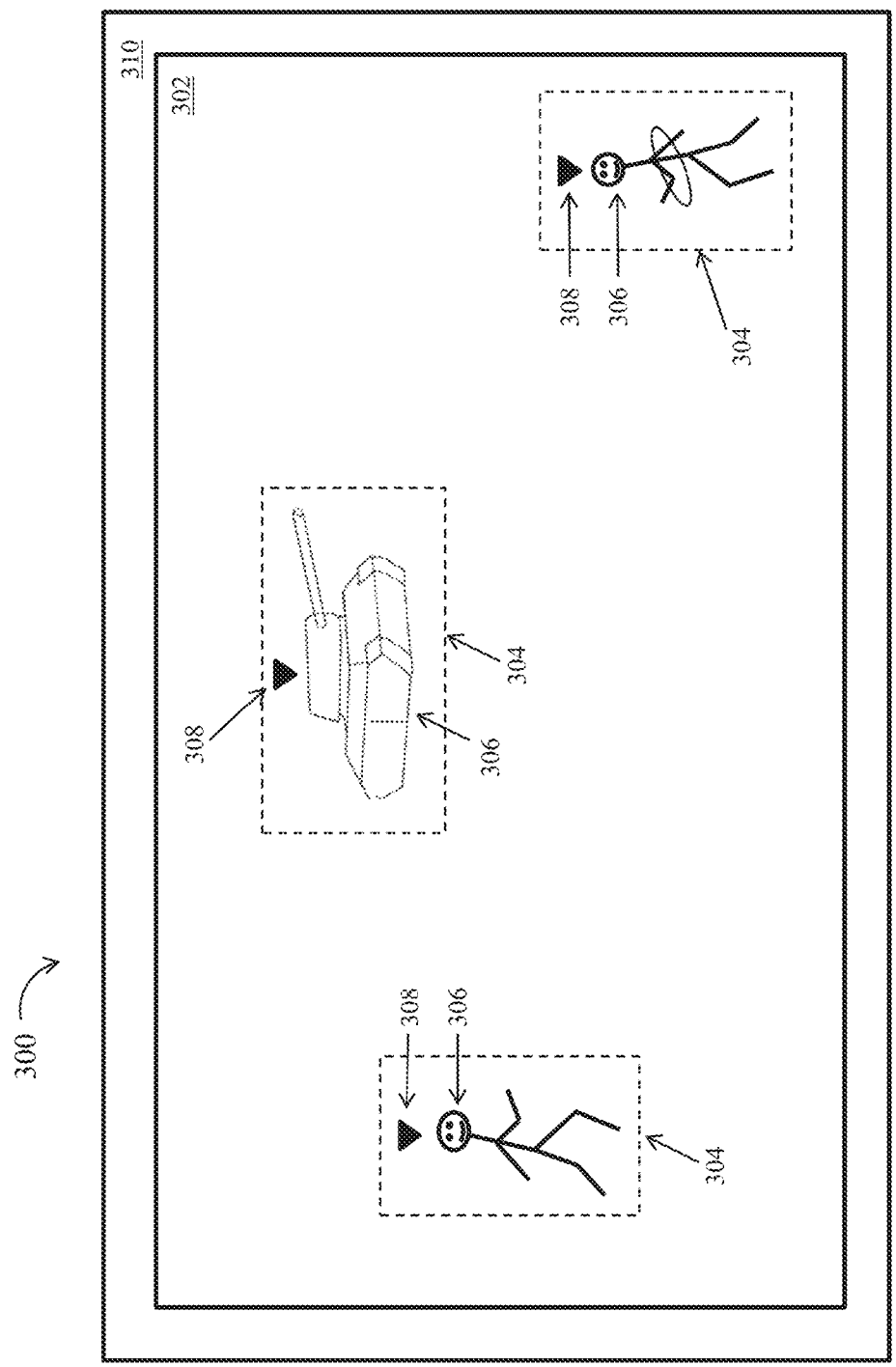
FIG. 3 shows a diagram illustrating a user interface (UI) for displaying video game data on a client device, according to some embodiments.

FIG. 3 shows a diagram illustrating a user interface (UI) 300 for displaying video game data on a client device, according to some embodiments. The UI 300 can include a video display window 310 for displaying video frames 302 The video frame 302 can include a plurality of graphical objects 306, each associated with a respective overlay 304. The overlays 304 can be transparent (e.g., the dashed rectangles do not show up on the screen). Each interactive overlay 304 can be positioned over a respective graphical object 306. Each interactive overlay 304 can include a respective cursor-like triangle 308 pointing to respective player avatars 306. The cursor-like triangle 308 (or some other animation element) can indicate the presence of the corresponding overlay 304, or can be indicate to a user of the client device 150 that the corresponding graphical object 306 is selectable. Upon the user of the spectator client device 150 selecting (e.g., clicking on, touching or hovering over) a pixel area (e.g., a rectangle including the player avatar) associated with one of the graphical objects 306 (e.g., player avatars), the one or more scripts 154 can cause the spectator client device 150 to display an animation object 312 (e.g., a disc) in the vicinity of (e.g., over, on top of, or adjacent to) the selected graphical object 306 (e.g., player avatar).

The one or more software scripts 154 can extract a timestamp from each game data frame received from the composing and broadcast system 130, and compare the extracted timestamp to one or more video timestamps associated with video game frames received from the live streaming system 140. To account for different time delays associated with game data stream and the video data stream, the one or more software scripts 154 can employ the synchronization techniques described in the in the Patent Application entitled "SYSTEMS AND METHODS FOR UTILIZING CLIENT-SIDE SYNCHRONIZATION OF VIDEO AND OVERLAY," and having Ser. No. 15/352,433, which is incorporated herein by reference in its entirety. The one or more software scripts 154 can also extract the position information (e.g., coordinates of various vertices of a pixel region defining a location of a player's avatar) for various graphical objects 306 from the game data frame, and use the extracted position information to determine the position of each interactive overlay 304. The overlay(s) 304 can include a HyperText Markup Language (HTML) overlay.

While FIG. 3 shows the interactive overlay 304 to include a cursor-like triangle 308, according to other implementations, the interactive overlay 304 can include various shapes or animation objects to show to the user the presence of an interactive overlay 304 associated with a given graphical object 306, such as a player avatar. Also, when a player graphical object 306 (e.g., avatar) is selected, the one or more software scripts 154 can employ various other animation objects or visual features (e.g., apart from the disc shown in FIG. 3) in the corresponding interactive overlay 304 to indicate the selection of that graphical object 306. Such animation object 312 and the corresponding overlay 304 can overlap the corresponding graphical object in each video following video frame. In some embodiments, upon selection of a given graphical object 306 (e.g., a player avatar), the one or more software scripts 154 can cause the spectator client device 150 to display game information associated with the selected graphical object 306 (e.g., a game score, equipment or armory, health state, emotional state, or a combination thereof). In some embodiments, the one or more software scripts 154 can cause the spectator client device 150 to enable customization of a selected graphical object 306. For example, the client device 150 can display one or more animation objects (e.g., objects indicative of eye glasses, hat, mask, costume, gun, sword, etc.). Upon the user selecting one of the animation objects, the one or more software scripts 154 can cause the spectator client device 150 to add the selected animation object to the overlay associated with the selected graphical object 306. To provide accurate customization, the game engine 120 may provide position and/or orientation information of a body part (e.g., head, eyes, arm, leg, etc.) for various player avatars as part of the game data. Using such information from the received game data, the client device 150 can accurately position the selected animation object relative to the avatar's body position and/or orientation in each video frame.

Figure 4:
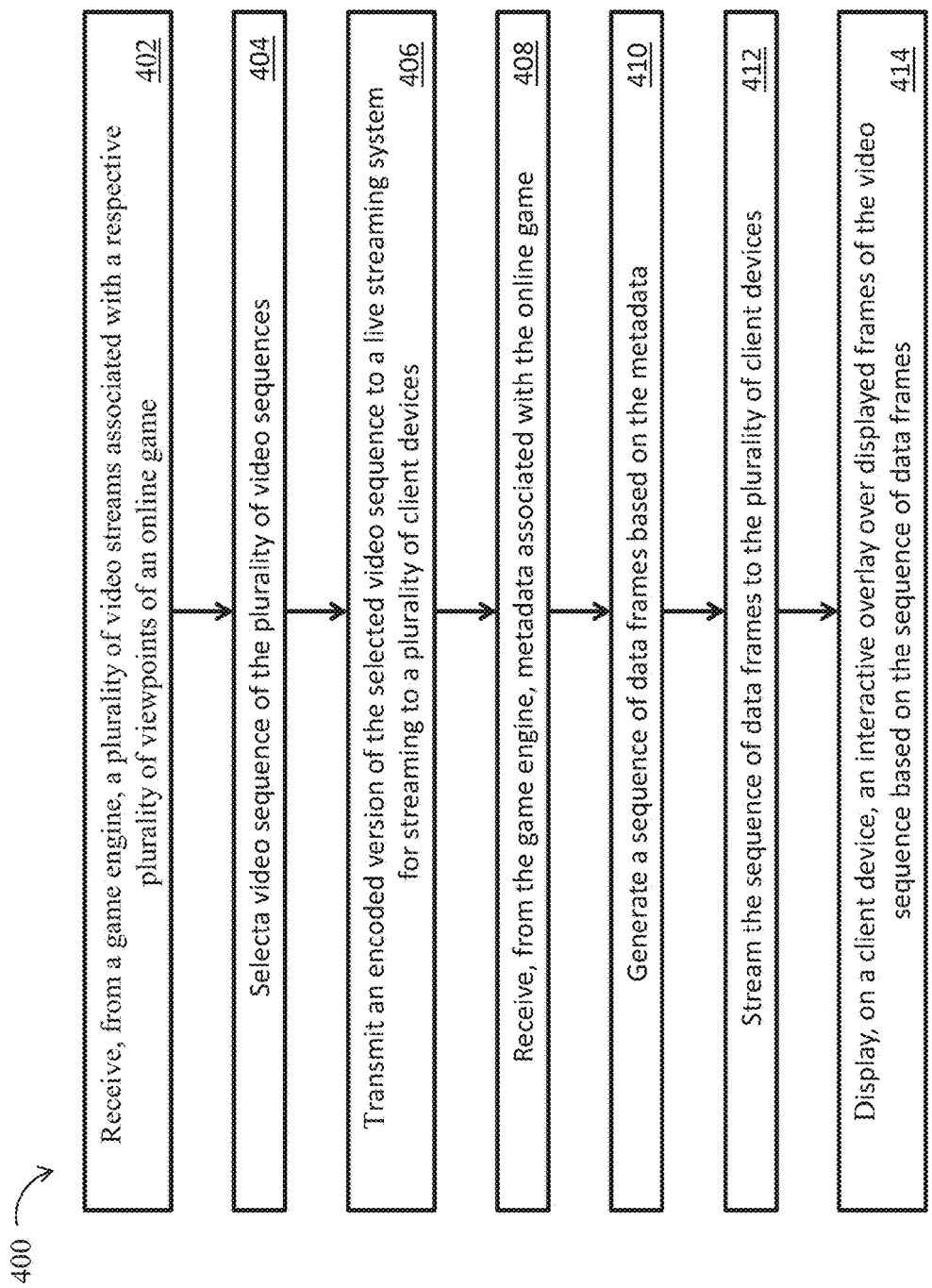
FIG. 4 is flow diagram illustrating a method of providing video game streams with interactive overlays, according to some embodiments.

FIG. 4 shows a flow diagram illustrating a method 400 of providing interactive overlays with video game streams, according to some embodiments. The method 400 can include receiving, from a game engine, a plurality of video game sequences associated with a respective plurality of viewpoints of an online game (ACT 402), selecting a video game stream of the plurality of video game streams (ACT 404), and transmitting a compressed version of the selected video game stream to a live streaming system (ACT 406). The live streaming system can stream the selected video game stream to a plurality of client devices. The method 400 can include receiving, from the game engine, metadata associated with the online game (ACT 408). The metadata can include positioning information for a graphical object in the online video game. The method 400 can include generating a sequence of data frames based on the metadata (ACT 410). Each data frame can include a respective time stamp and positioning information for the graphical object in a respective frame of the video sequence. The method 400 can include a data streaming engine streaming the sequence of data frames to the plurality of client devices (ACT 412). The method 400 can include a client device of the plurality of client devices displaying an interactive overlay over displayed frames of the video game stream based on the sequence of data frames (ACT 414). The client device can display the interactive overlay at a screen position determined based on the position information of the graphical object.

The method 400 can include receiving, from a game engine, a plurality of video game streams associated with a respective plurality of viewpoints of an online game (ACT 402). Upon receiving a request to register a game play for live streaming, the composing and broadcast system 130 can assign a stream ID to the game play and provide the stream ID to the game engine 120. As the game is progressing, the game engine 120 can generate a plurality of video games streams, each associated with a respective viewpoint. Each viewpoint can be associated with a player of the game or a virtual camera in the virtual environment of the game. Each video game stream can include a respective video stream and a respective audio stream. The game engine 120 can provide the generated frames of the plurality of video game streams to the composing and broadcast system 130 as they are generated, in real time.

The method 400 can include selecting a video game stream of the plurality of video game streams (ACT 404), and transmitting a compressed version of the selected video game stream to a live streaming system (ACT 406). The video streaming engine 137 can receive video and audio frames of the plurality of video games streams. The composing and broadcast system 130 can select a video game stream among the plurality of video game streams for broadcasting to a plurality of client devices 150 for viewing. The video streaming engine 137 can compress video and audio frames of the selected video game stream to generate a compressed video/audio stream. The video streaming engine 137 can transmit compressed video/audio frames to the live streaming system 140, for live streaming to the plurality of client devices 150. The live streaming system can stream compressed video/audio frames of the selected video game stream to the plurality of client devices 150.

The method 400 can include receiving, from the game engine, metadata (or game data) associated with the online game (ACT 408), generating a sequence of data frames based on the metadata (ACT 410). The metadata can include positioning information for a graphical object in the online video game. The data streaming engine 139 can receive game data from the gameplay engine 124. The received game data (or metadata) can include multiple streams, for example, as depicted in FIG. 2. The game data can include information indicative of dynamic positions (e.g., changing from one video frame to another) of one or more player avatars or graphical objects in the plurality of video game streams. The game data can include information indicative of viewpoints, over time, for the plurality of video game streams received from the game engine 120. The game data can also include information indicative of game events, information related to various players (or player avatars), such as game scores, equipment, health statuses, emotional statuses, the like, or a combination thereof. The game data can also include other information, for example, as discussed above with regard to FIG. 2.

The data streaming engine 139 can generate a sequence (or stream) of data frames based on the received game data. For example, the data streaming engine 139 can generate the data frames as described above with regard to FIG. 2. Each data frame can correspond to a respective video frame in the video game stream transmitted to the live streaming system 140 for broadcasting to the client devices 150. Each data frame can include position information of one or more graphical objects (or player avatar(s)) indicative of the position(s) of the graphical object(s) in the respective video frame.

The method 400 can include the data streaming engine 139 streaming the data frames to the plurality of client devices (ACT 412). Each data frame can include a respective timestamp based on a timeline associated with the composing and broadcast system 130. For each data frame, the data streaming engine 139 can embed the respective timestamp in that data frame before streaming to client devices 150. The data streaming engine 139 can stream the data frames to each client device 150 through a respective communication channel 151 established with that client device 150 (e.g., as described with regard to FIG. 1 above).

The method 400 can include a client device 150 of the plurality of client devices 150 displaying an interactive overlay over displayed frames of the video game stream based on the sequence of data frames (ACT 414). The client device 150 can display the interactive overlay at a screen position determined based on the position information of a respective graphical object (a graphical object with which the interactive overlay is associated). A software script (e.g., a Java script) running on the client device 150 can cause the client device to extract, from each received data frame, the respective time stamp and the respective position information for one or more graphical objects (e.g., player avatar(s) 306). The client device 150 can use time stamps extracted from the data frames and video timestamps extracted from video frames received from the live streaming system 140. The video timestamps associated with video frames can be set relative to a timeline of the live streaming system 140. The client device 150 can map each data frame to a respective video frame. The client device 150 can use position information extracted from a given data frame to determine a screen position, over the corresponding video frame, for displaying the interactive overlay. The interactive overlay can be a HTML overlay. The interactive overlay can provide interactive features as described with regard to FIG. 3.

Figure 5:
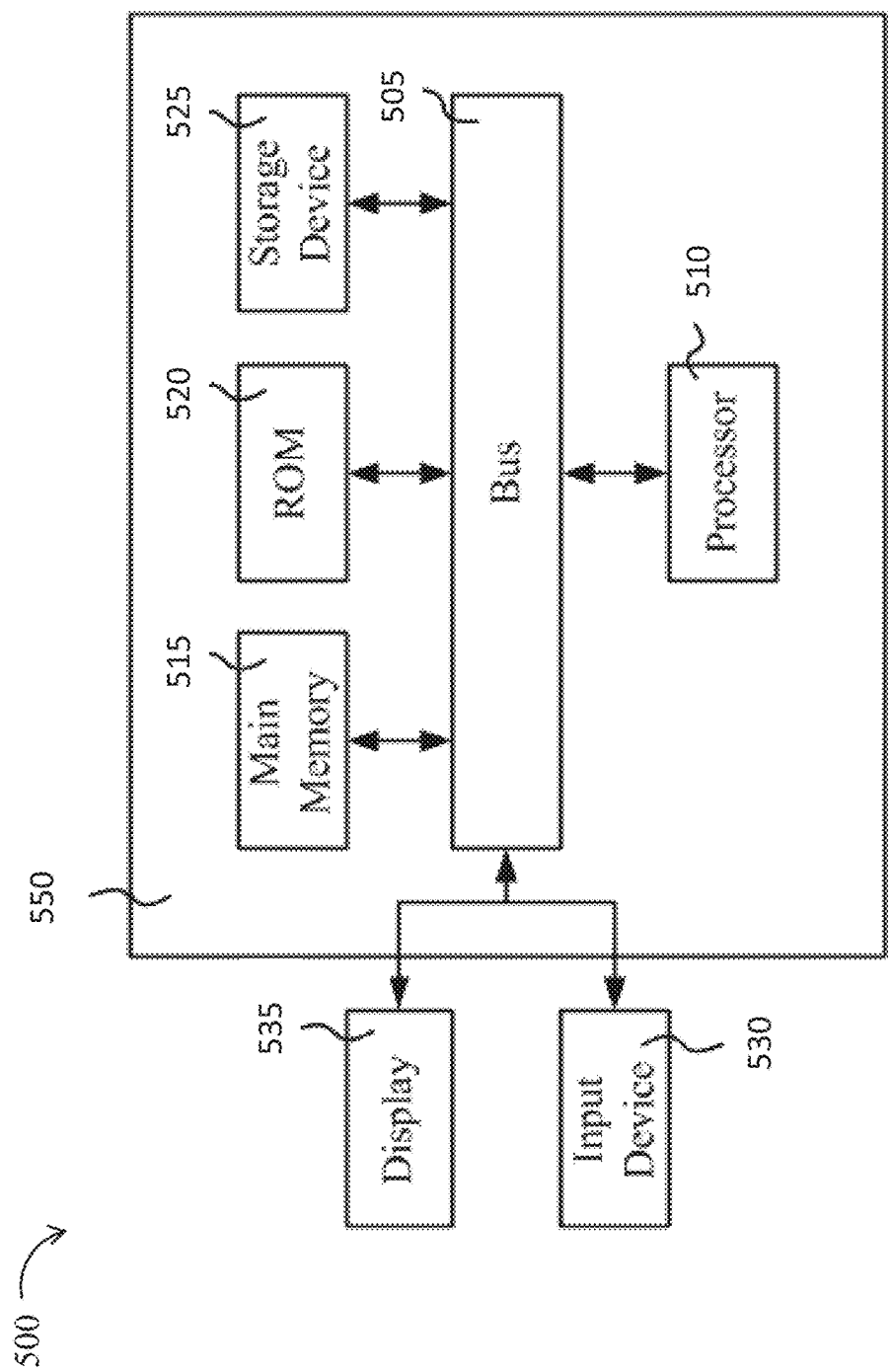
FIG. 5 is a block diagram of a computer system, according to some embodiments.

FIG. 5 is a block diagram of a computer system 500 that can be used to implement the player client devices 110, the game engine 120 or components thereof, the composing and broadcast system 130 or components thereof, the spectator client devices 150, or other components described herein. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to some implementations, the processes or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 5500 to perform the illustrative processes or method ACTs described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Some embodiments can be implemented in digital electronic circuitry, or in computer software embodied on a tangible medium, firmware, or hardware, including the structures disclosed in this specification and their structural equivalents, or in combinations of one or more of them. Some embodiments can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only as well as both 'A' and Where technical features in the drawings, detailed description or any claim are followed by reference identifiers, the reference identifiers have been included to increase the intelligibility of the drawings, detailed description, and claims. Accordingly, neither the reference identifiers nor their absence have any limiting effect on the scope of any claim elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A system to provide interactive overlays with video game streams, the system comprising:
one or more computer servers and one or more software scripts executing on a plurality of client devices associated with a plurality of online spectators of an online game, the one or more computer servers comprising:

a video streaming engine configured to:
- receive, from a game engine, a plurality of video game sequences associated with a respective plurality of viewpoints of the online game;
- select a video game sequence of the plurality of video game sequences; and
- transmit a compressed version of the selected video game sequence to a live streaming system, the live streaming system configured to stream the selected video game sequence to the plurality of client devices, and a data streaming engine configured to:
- receive, from the game engine, metadata associated with the online game, the metadata including positioning information for a graphical object in the online video game;
- generate a sequence of data frames based on the metadata, each data frame including a respective time stamp and positioning information for the graphical object in a respective video frame of the video game sequence; and
- stream the sequence of data frames to the plurality of client devices, at a client device of the plurality of client devices, the one or more software scripts configured to cause that client device to display an interactive overlay over displayed video frames of the video game sequence based on the sequence of data frames, the interactive overlay displayed in association with a dynamic position of a graphical object in the displayed video frames.

2. The system of claim 1, wherein each video game sequence includes a respective video sequence and a respective audio sequence.

3. The system of claim 1, wherein the graphical object includes a player avatar.

4. The system of claim 1, wherein the video streaming engine is configured to encode the selected video game sequence.

5. The system of claim 1, wherein the selected video game sequence is a first video game sequence and the video streaming engine is configured to:
- select a second video game sequence different than the first video game sequence;
- halt transmission of the encoded version of the first video game sequence to the live streaming system; and
- transmit a compressed version of the second video game sequence to the live streaming system, the live streaming system configured to stream the second video game sequence to the plurality of client devices.

6. The system of claim 1, wherein the one or more software scripts are configured to cause the client device to display game information associated with the graphical object responsive to interaction with the interactive overlay at the client device.

7. The system of claim 1, wherein the one or more software scripts are configured to cause the client device to display an animation object over, or in the vicinity of, the graphical object, upon interaction with the interactive overlay.

8. The system of claim 1, wherein the one or more software scripts are configured to cause the client device to:
- display one or more animation objects responsive to interaction with the interactive overlay at the client device; and
- upon selection of an animation object among the one or more animation objects, display the selected animation object over displayed video frames of the video sequence, the selected animation object displayed at a position dependent on the dynamic position of the graphical object in the displayed video frames.

9. The system of claim 1 further comprising a session management component configured to establish communication channels with the client devices, the sequence of data frames streamed to the plurality of client devices over the established communication channels.

10. The system of claim 1, wherein at least two of the data frames in the sequence of data frames have different sizes.

11. A method of providing interactive overlays with video game streams, the method comprising:
- receiving, by one or more processors, from a game engine, a plurality of video game sequences associated with a respective plurality of viewpoints of an online game;
- selecting, by the one or more processors, a video game sequence of the plurality of video game sequences;
- transmitting, by the one or more processors, a compressed version of the selected video game sequence to a live streaming system, the live streaming system streaming the selected video game sequence to a plurality of client devices;
- receiving, from the game engine, metadata associated with the online game, the metadata including positioning information for a graphical object in the online video game;
- generating, by the one or more processors, a sequence of data frames based on the metadata, each data frame including a respective time stamp and positioning information for the graphical object in a respective video frame of the video game sequence; and,
- streaming, by the one or more processors, the sequence of data frames to the plurality of client devices;
- wherein the streaming is capable of being displayed by a client device of the plurality of client devices including an interactive overlay over displayed video frames of the video game sequence based on the sequence of data frames, wherein the interactive overlay is capable of being displayed in association with a dynamic position of a graphical object in the displayed video frames.

12. The method of claim 11, wherein the graphical object includes a player avatar.

13. The method of claim 11 comprising encoding the selected video game sequence.

14. The method of claim 11, wherein the selected video game sequence is a first video game sequence and the method comprising:
- selecting a second video game sequence different than the first video game sequence;
- halting transmission of the encoded version of the first video game sequence to the live streaming system; and
- transmitting a compressed version of the second video game sequence to the live streaming system, the live streaming system configured to stream the second video game sequence to the plurality of client devices.

15. The method of claim 11 further comprising:
- displaying, by the client device, game information associated with the graphical object responsive to interaction with the interactive overlay at the client device.

16. The method of claim 11 further comprising:
- displaying, by the client device, an animation object over, or in the vicinity of, the graphical object, upon interaction with the interactive overlay.

17. The method of claim 11 further comprising:
displaying, by the client device, one or more animation objects responsive to interaction with the interactive overlay at the client device; and
upon selection of an animation object among the one or more animation objects, displaying the selected animation object over displayed video frames of the video sequence, the selected animation object displayed at a position dependent on the dynamic position of the graphical object in the displayed video frames.

18. The method of claim 11 further comprising establishing, by the one or more processors, communication channels with the plurality of client devices, the sequence of data frames streamed to the plurality of client devices over the established communication channels.

19. The method of claim 11, wherein at least two of the data frames in the sequence of data frames have different sizes.

20. A non-transitory computer-readable medium comprising computer code instructions stored thereon, the computer code instructions, when executed by one or more processors, cause one or more processors to perform the method including:
receiving, from a game engine, a plurality of video game sequences associated with a respective plurality of viewpoints of an online game;
selecting a video game sequence of the plurality of video game sequences;
transmitting a compressed version of the selected video game sequence to a live streaming system, the live streaming system streaming the selected video game sequence to a plurality of client devices;
receiving, from the game engine, metadata associated with the online game, the metadata including positioning information for a graphical object in the online video game;
generating a sequence of data frames based on the metadata, each data frame including a respective time stamp and positioning information for the graphical object in a respective video frame of the video game sequence; and,
streaming the sequence of data frames to the plurality of client devices,
wherein such streaming of data frames is capable of causing display, at a client device of the plurality of client devices, of an interactive overlay over displayed video frames of the video game sequence based on the sequence of data frames, the interactive overlay displayed in association with a dynamic position of a graphical object in the displayed video frames.

* * * * *